United States Patent [19]
Kishimoto et al.

[11] Patent Number: 5,881,564
[45] Date of Patent: Mar. 16, 1999

[54] COMPRESSOR FOR USE IN REFRIGERATOR

[75] Inventors: Akio Kishimoto; Kenji Ueda; Zenichi Yoshida, all of Takasago, Japan

[73] Assignee: Mitsubishi Heavy Industries, Ltd., Tokyo, Japan

[21] Appl. No.: 956,738

[22] Filed: Oct. 23, 1997

[30] Foreign Application Priority Data

Oct. 25, 1996 [JP] Japan .................................. 8-299895

[51] Int. Cl.⁶ .................................................. F25B 31/02
[52] U.S. Cl. ............................ 62/193; 62/469; 418/102
[58] Field of Search ............................ 62/469, 468, 230, 62/192, 193, DIG. 2, 505, 84; 184/6.16; 418/102

[56] References Cited

U.S. PATENT DOCUMENTS

| | | | |
|---|---|---|---|
| 3,931,718 | 1/1976 | Haselden | 62/505 |
| 5,066,197 | 11/1991 | Champagne | 62/505 X |
| 5,088,292 | 2/1992 | Champagne et al. | 62/84 |
| 5,167,496 | 12/1992 | Jacobsson et al. | 418/102 |

*Primary Examiner*—Harry B. Tanner
*Attorney, Agent, or Firm*—Alston & Bird LLP

[57] ABSTRACT

A compressor (30) for use in a refrigerator, which has a rotary shaft (33) supported by bearings (39 to 42) to be lubricated by a liquid refrigerant and is adapted to permit the rotary shaft 33 to continue rotating for a while after a liquid refrigerant pump (36) is stopped at, for example, a power failure, thereby preventing the bearings (39 to 42) from being damaged. To that end, the compressor (30) is further provided with a header (52) for storing a predetermined amount of a high-pressure liquid refrigerant, and with check valves (51, 54 and 56) for maintaining the internal pressure of this header (52) at a high pressure for a predetermined time period after a power failure occurs.

4 Claims, 8 Drawing Sheets

F I G. 2
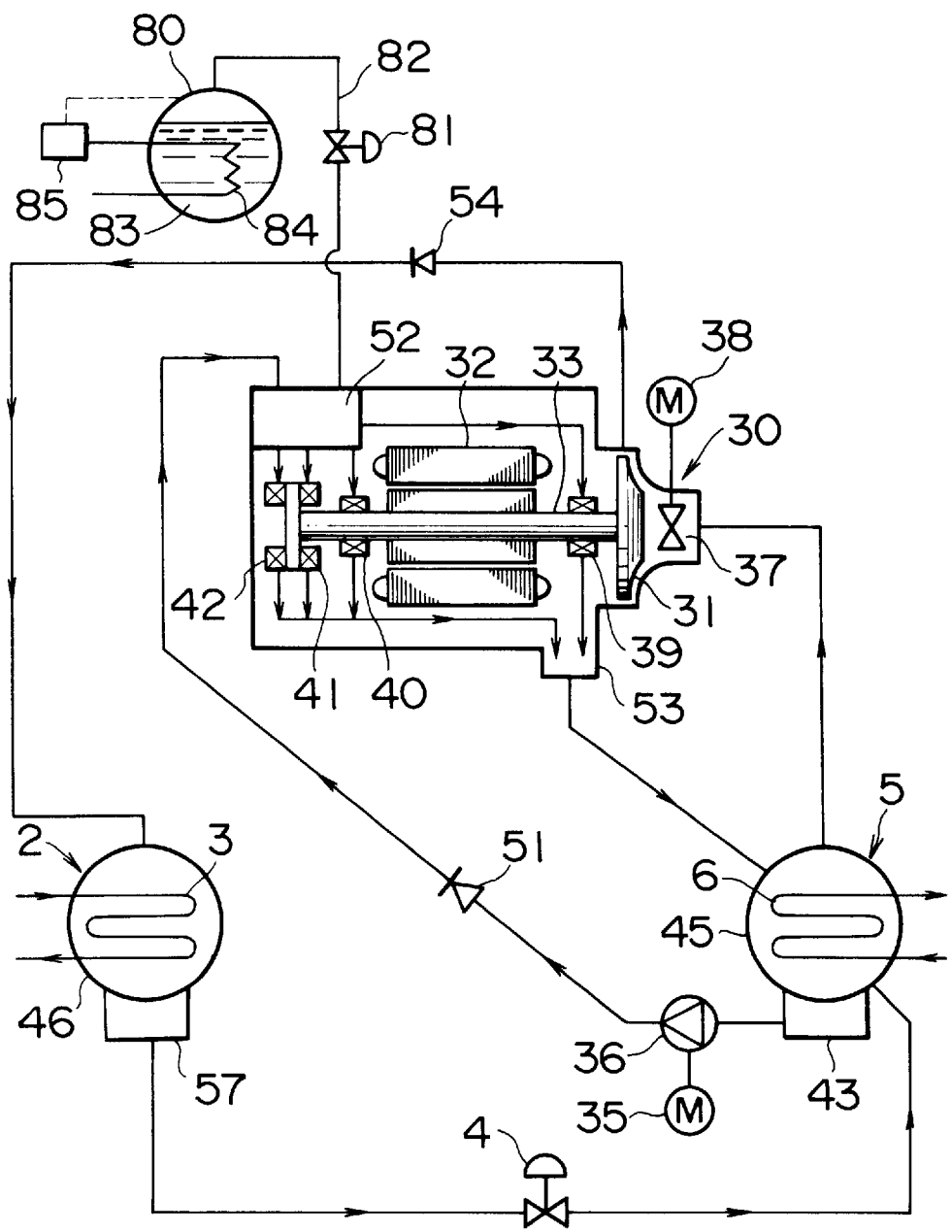

F I G. 5
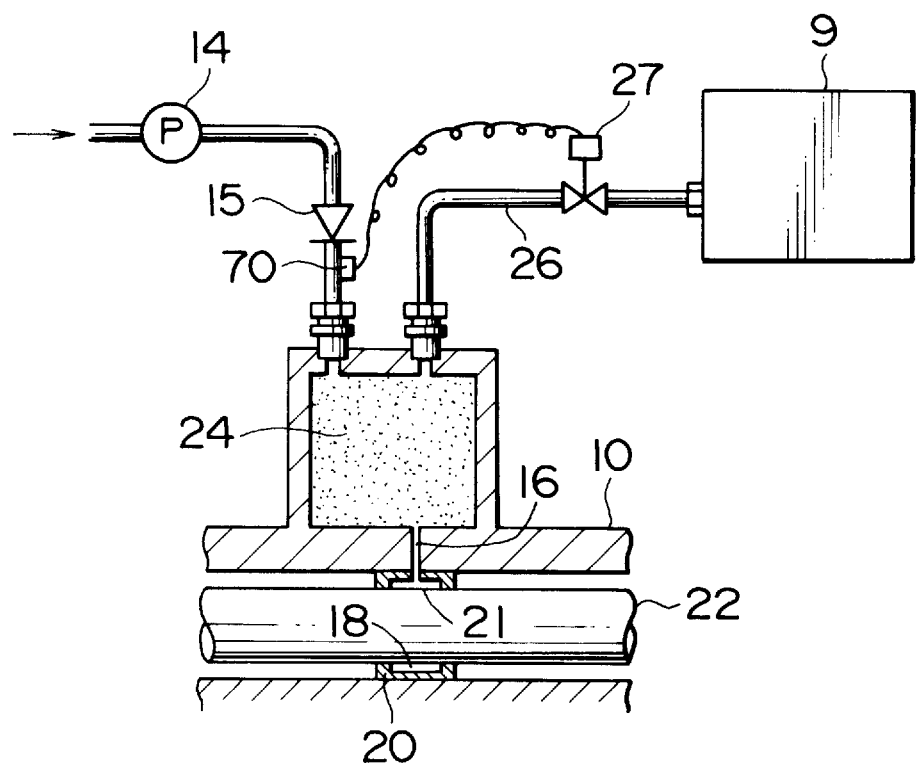

COMPRESSOR FOR USE IN REFRIGERATOR

FIELD OF THE INVENTION AND RELATED ART STATEMENT

The present invention relates to a compressor for use in a refrigerator, which is provided with a rotary shaft rotatably supported by a bearing that is lubricated by liquid refrigerant.

FIG. 8 shows a bearing of a compressor relating to the present invention, which is intended for use in a refrigerator.

Rotary shaft 01 of the compressor is supported by the bearing 02. Liquid refrigerant is supplied into a recess portion 07 dug (or counterbored) in a bearing surface portion 06 of this bearing 02 through passages 04 and 05 which are bored in a housing 03 and the bearing 02, respectively. Then, the liquid refrigerant, which having lubricated the bearing surface 06 of the aforesaid baring 02 and the outer peripheral surface of the rotary shaft 02, streams out of both of the left and right sides of the bearing 02. Incidentally, reference numeral 09 designates a retainer.

The aforementioned compressor for use in a refrigerator has a problem in that, when the temperature rising of the rotary shaft 01 and the bearing 02 occurs owing to an operation of the compressor, there is a fear that the lubrication failure or the seizure of the bearing 02 is caused by the vaporization of the liquid refrigerant supplied to the aforesaid bearing 02.

Further, in the case that the liquid refrigerant pump for supplying liquid refrigerant stops owing to a power failure or to a breakdown of the compressor, the supply of the liquid refrigerant is ceased in a short time. In contrast, the rotary shaft 01 keeps rotating for some time owing to the inertia thereof, while gradually reducing the rotational speed thereof. Thus, the aforementioned compressor has another problem in that the aforesaid bearing 02 is damaged during the rotary shaft 01 keeps rotating in such a case.

OBJECT AND SUMMARY OF THE INVENTION

The present invention is accomplished to solve the aforementioned problems of the aforesaid compressor for use in a refrigerator.

Accordingly, an object of the present invention is to provide a compressor for use in a refrigerator, which solves the aforementioned problems.

The gist of the present invention for achieving the foregoing object, lies in that, in a compressor (hereunder sometimes referred to as a first compressor of the present invention) for use in a refrigerator, which has a rotary shaft supported by a bearing lubricated by a liquid refrigerant, a header (assembly) for storing a predetermined amount of a high-pressure liquid refrigerant to be supplied to the aforesaid bearing, and means for maintaining an internal pressure of this header at a high pressure for a predetermined time period after a power failure by means of a check (or non-return) valve are provided.

Another characteristic aspect of an embodiment of the first compressor of the present invention resides in that a saturated liquid refrigerant stored in a reservoir of an evaporator is supplied to the aforesaid header by being pressurized by means of a liquid refrigerant pump.

Still another characteristic aspect of an embodiment of the first compressor of the present invention resides in that means for supplying a liquid refrigerant, which is stored in a reservoir of a condenser, to the aforesaid header at a power failure is provided in the first compressor.

Yet another characteristic aspect of an embodiment of the first compressor of the present invention resides in that a tank for storing a liquid refrigerant therein, a heater for heating the liquid refrigerant stored in this tank, a controller for regulating a heating value of this heater, and means for causing a solenoid (controlled or operated) valve to make the aforesaid tank communicate with the aforesaid header when stopping the aforesaid liquid refrigerant pump are provided in the first compressor.

Another compressor (hereunder sometimes referred to as a second compressor of the present invention) for use in a refrigerator according to the present invention, which has a rotary shaft supported by a bearing lubricated by a liquid refrigerant, characterized in that a piston thrust forward by a spring is liquid-tightly and slidably fitted into a cylinder, that a head side chamber is formed from the aforesaid piston and an end portion of the aforesaid cylinder and that a high-pressure liquid refrigerant is supplied to the aforesaid bearing through this head side chamber.

Another compressor (hereunder sometimes referred to as a third compressor of the present invention) for use in a refrigerator according to the present invention, which has a rotary shaft supported by a bearing lubricated by a liquid refrigerant, characterized by comprising a reservoir liquid tank for storing a predetermined amount of a high-pressure liquid refrigerator to be supplied to the aforesaid bearing, a storage gas tank for storing a predetermined quantity of a high-pressure gaseous refrigerant, and means for introducing a high-pressure gaseous refrigerant, which is stored in the aforesaid storage gas tank, to the reservoir liquid tank at a power failure.

Another compressor (hereunder sometimes referred to as a fourth compressor of the present invention) for use in a refrigerator according to the present invention, which has a rotary shaft supported by a bearing lubricated by a liquid refrigerant, characterized by comprising a reservoir liquid tank for storing a predetermined amount of a high-pressure liquid refrigerator to be supplied to the aforesaid bearing, a gas cylinder (or bottle) for storing high-pressure gas, and means for introducing a high-pressure gaseous refrigerant, which is stored in the aforesaid gas cylinder, to the reservoir liquid tank at a power failure.

Another compressor (hereunder sometimes referred to as a fifth compressor of the present invention) for use in a refrigerator according to the present invention, which has a rotary shaft supported by a bearing lubricated by a liquid refrigerant, characterized in that a refrigerant jacket for vaporizing a liquid refrigerant is provided on the outer peripheral surface of the aforesaid bearing.

Another characteristics aspect of an embodiment of the fifth compressor of the present invention resides in that means for introducing the liquid refrigerant to the aforesaid refrigerant jacket after lubricating the aforesaid bearing is provided in the fifth compressor.

The aforementioned compressors of the present invention have the following advantageous effects.

In the case of the first compressor of the present invention, the internal pressure of the header for storing a predetermined amount of a high-pressure liquid refrigerant to be supplied to the bearing is maintained at a high pressure for a predetermined time after a power failure by means of a check valve. Thus, even when the rotary shaft keeps rotating form a while after the power failure, the liquid refrigerant contained in the header can be supplied to the bearing during that. Consequently, the bearing can be prevented from being damaged.

When supplying a saturated liquid refrigerant, which is stored in the reservoir, to the aforesaid header by pressurizing such a liquid refrigerant by means of the liquid refrigerant pump, the liquid refrigerant can be easily brought into a supercooled state. Thus, the liquid refrigerant can be restrained from evaporating in the bearing. Consequently, the bearing can be securely lubricated.

In the case where the first compressor of the present invention is further provided with means for supplying the aforesaid header with the liquid refrigerant stored in the reservoir of the condenser at a power failure, the liquid refrigerant can be supplied to the bearing for a long time period. Thus, the bearing can be securely prevented from being damaged.

In the case where the first compressor of the present invention is further provided with a tank for storing a liquid refrigerant, a heater for heating the liquid refrigerant stored in this tank, a controller for regulating a heating value of the heater and means for causing the aforesaid tank to communicate with the aforesaid header when the aforesaid liquid refrigerant pump is stopped, a high-pressure gaseous refrigerant contained in the aforesaid tank is applied to the header when the aforesaid liquid refrigerant pump is stopped. Thus, the liquid refrigerant contained in the aforesaid header can be securely supplied to the bearing.

In the case of the second compressor of the present invention, the liquid refrigerant is supplied to the bearing through the head side chamber formed by liquid-tightly and slidably fitting the piston, which is thrust forward by the spring, in the cylinder. Thus, even if the rotary shaft continues rotating for a while after a power failure occurs, the liquid refrigerant contained in the aforesaid head side chamber can be supplied to the bearing during that. Consequently, the bearing can be prevented from being damaged.

In the case of the third compressor of the present invention, the liquid refrigerant stored in the reservoir tank is supplied to the bearing by introducing a high-pressure gaseous refrigerant, which is stored in the storage tank, to this reservoir tank at a power failure. Thus, even if the rotary shaft continues rotating for a while after a power failure occurs, the bearing can be prevented from being damaged during that.

In the case of the fourth compressor of the present invention, the liquid refrigerant stored in the reservoir tank is supplied to the bearing by introducing a high-pressure gaseous refrigerant, which is stored in the gas cylinder, to the reservoir tank at a power failure. Consequently, even if the rotary shaft continues rotating for a while after a power failure occurs, the bearing can be prevented from being damaged during that.

In the case of the fifth compressor of the present invention, the liquid refrigerant evaporates in the refrigerant jacket provided on the outer peripheral side of the bearing, so that the bearing is cooled by the latent heat of vaporization of this liquid refrigerant. Thus, the liquid refrigerant can be prevented from evaporating in the bearing surface portion of the bearing. Consequently, the bearing can be securely cooled by the liquid refrigerant.

Additionally, in the case that the liquid refrigerant is introduced to the refrigerant jacket after lubricating the bearing and is evaporated, the configuration of the compressor can be simplified.

BRIEF DESCRIPTION OF THE DRAWINGS

FIG. 2 is a system diagram showing a second embodiment of the present invention;

FIG. 5 is a partially sectional view showing a fifth embodiment of the present invention;

DETAILED DESCRIPTION OF PREFERRED EMBODIMENTS

Figure 1:
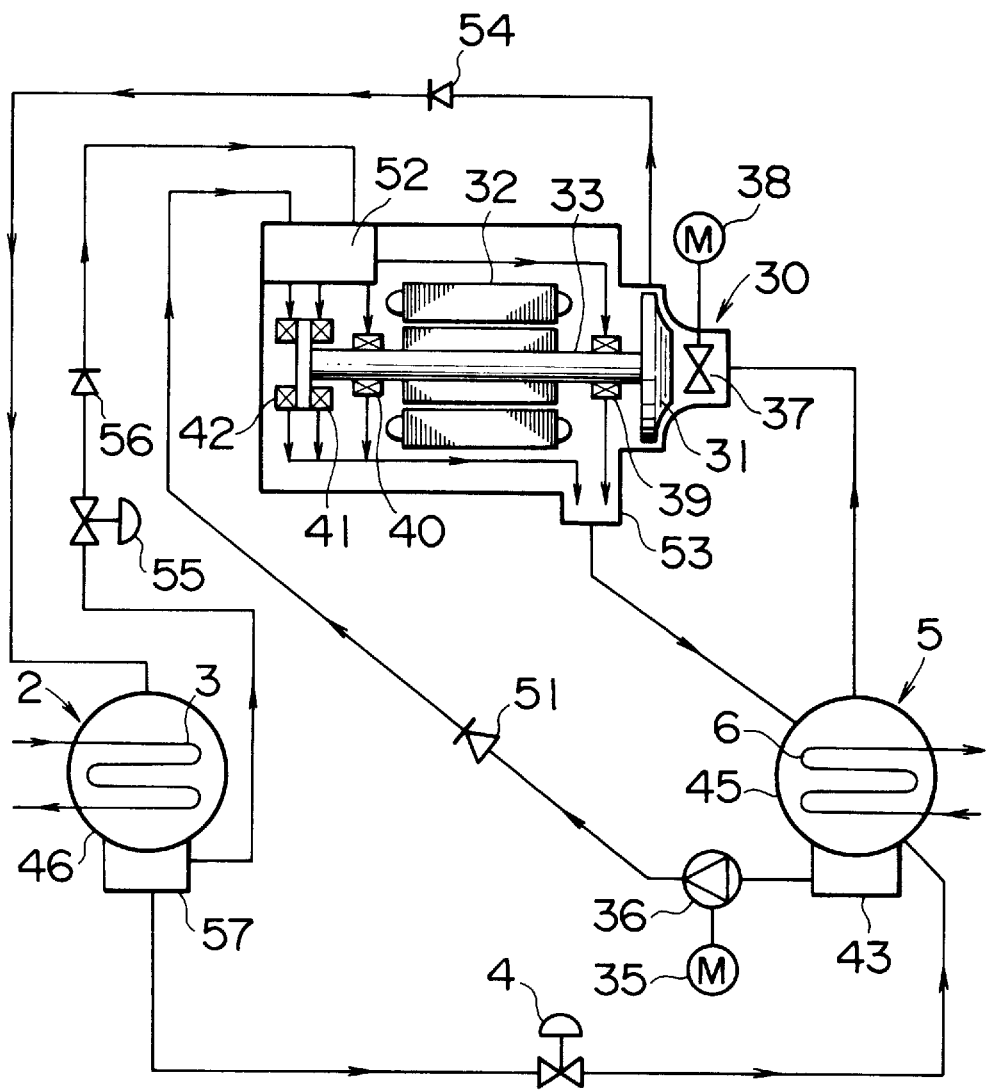
FIG. 1 is a system diagram showing a first embodiment of the present invention.

FIG. 1 shows a first embodiment of the present invention. Centrifugal impeller 31 of a turbocompressor 30 is fixedly mounted on an end portion of a rotary shaft 33 of an inverter motor 32.

Suction vane 37 is provided in the aforesaid turbocompressor 30. Quantity of refrigerant gas sucked into the turbocompressor 30 is regulated by opening and closing this suction vane 37 by means of a motor 38.

Rotary shaft 33 of the inverter motor 32 is supported by radial bearings 39 and 40 and thrust bearings 41 and 42.

Thus, when operating a turborefrigerator, a gaseous refrigerant discharged from the turbocompressor 30 enters a housing 46 of a condenser 2 through a check valve 54 and is condensed and liquefied therein by dissipating heat to a cooling medium, such as cooling water, flowing and passing through a heat transfer tube 3.

This liquid refrigerant then enters a throttling mechanism 4 wherein an adiabatic expansion of the refrigerant is caused by being throttled. Simultaneously with this, the flow rate thereof is regulated, so that a gas-liquid two-phase flow thereof is obtained.

Subsequently, this refrigerant enters a housing 45 of an evaporator 5, wherein this refrigerant evaporates and vaporizes by cooling a medium to be cooled, such as cooling water and brine. Thereafter, this cooled medium is sucked again into the turbocompressor 30 and is further compressed therein again.

Saturated liquid refrigerant contained in a reservoir 43, which is formed under the evaporator 5, is extracted by a liquid refrigerant pump 36 which is driven by a motor 35. After pressurized by this liquid refrigerant pump 36 in such a manner as to have a predetermined pressure, namely, in such a way as to be put into a supercooled state, the saturated liquid refrigerator enters the header 52 through the check valve 51. Then, the refrigerant is supplied therefrom to and lubricates the bearings 39 to 42.

Further, after lubricating the bearings 39 to 42, the liquid refrigerant is collected in the reservoir 53. Subsequently, the liquid refrigerant returns to the housing 45 of the evaporator 5 owing to the self-weight thereof and a differential pressure.

When the solenoid valve 55 is opened at a power failure, a high-pressure liquid refrigerant having been collected in a reservoir 57 of the condenser 2 flows into the header 52 through the solenoid valve 55 and the check valve 56.

Incidentally, the solenoid valve 55 may be adapted to open when a discharge pressure of the liquid refrigerant pump 36 becomes lower than a predetermined value.

Thus, when a power failure occurs, the liquid refrigerant pump 36 stops in a short time. In contrast, the rotary shaft 33 of the turbocompressor 30 continues rotating for a while owing to the inertia thereof.

However, the internal pressure of the header 52 is maintained by the check valves 51, 54 and 56 at a high pressure for a while. Thus, the high-pressure liquid refrigerant stored in the header 52 is supplied to the bearings 39 to 42. Consequently, the bearings 39 to 42 are prevented from being damaged.

Further, when a power failure occurs, a high-pressure liquid refrigerant is supplied from the reservoir 57 of the condenser 2 to the header 52 by the solenoid valve 55 and the check valve 56. Thus, during the turbocompressor 30 continues rotating owing to the inertia thereof, a sufficient amount of liquid refrigerant can be supplied to the bearings 39 to 42.

Turning to FIG. 2, there is illustrated a second embodiment of the present invention.

This second embodiment is provided with a tank 80 for storing a high-pressure liquid refrigerant. Top part of this tank 80 is connected with the top part of the header 52 through a gas pipe 82 into which the solenoid valve 81 is inserted.

Heater 84 is dipped into the liquid refrigerant stored in the tank 80. By regulating the heating value of this heater 84 by means of a controller 85, the internal pressure of the tank 80 is maintained in such a manner as not to be lower than the discharge pressure of the liquid refrigerant pump 36.

The remaining portion of the configuration of this embodiment is similar to the corresponding portion of the first embodiment of the present invention, which is illustrated in FIG. 1. Thus, in FIG. 2, same reference character designate corresponding members of the first embodiment. Further, the description of such members is omitted.

Thus, when the liquid refrigerant pump 36 stops owing to a power failure or to a breakdown of the compressor, the solenoid valve 81 opens. Then, a high-pressure liquid refrigerant contained in the tank 80 is applied to the header 52 through the gas pipe 82. Thus, the liquid refrigerant contained in the header 52 can be securely supplied to the bearings 39 to 42.

Figure 3:
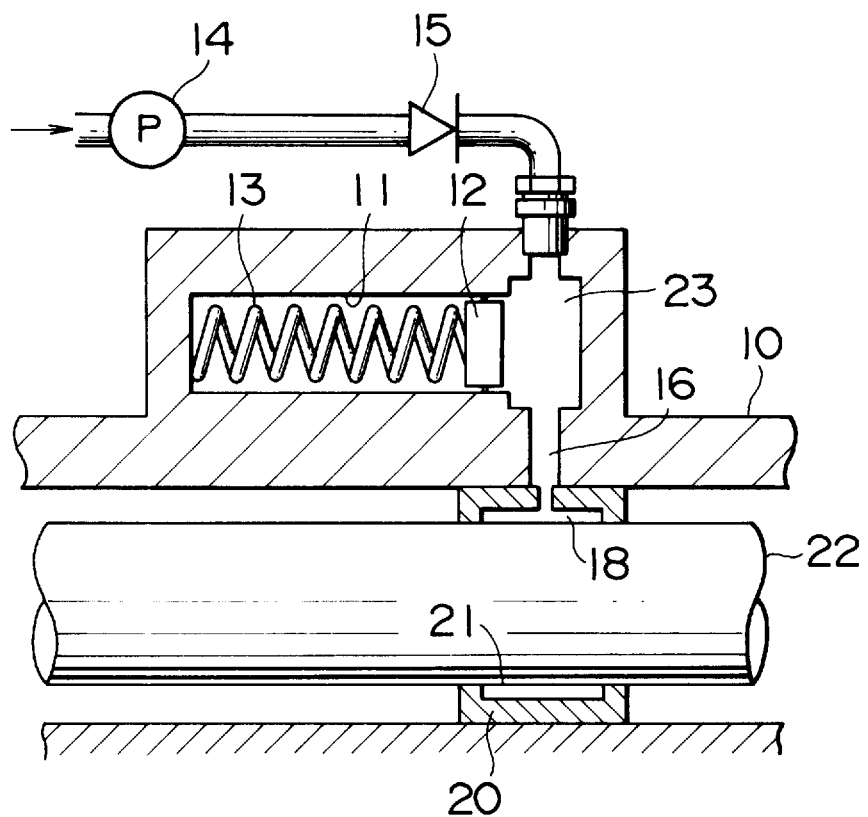
FIG. 3 is a partially sectional view showing a third embodiment of the present invention.

Referring now to FIG. 3, there is illustrated a third embodiment of the present invention.

In the case of this third embodiment, a piston 12 is liquid-tightly and slidably fitted into a cylinder 11 which is formed in a housing 10 of a compressor. In addition, a coil spring 13 for pushing this piston 12 toward a head side chamber 23 is provided therein.

Thus, during an operation of the compressor, a liquid refrigerant is pressurized by a liquid refrigerant pump 14 and is then supplied to the head side chamber 23 through the check valve 15. Subsequently, the liquid refrigerant flows therefrom into a recess portion 18 dug in a bearing surface portion 21 of a bearing 20 through a passage 16 and thus lubricates a bearing surface 21 of the bearing 20 and the outer peripheral surface of the rotary shaft 22.

During that, the piston 12 is pressed by the pressure of the liquid refrigerant contained in the head side chamber 21. Thus, the piston 12 causes a coil spring 13 to contract, and is placed to the left, as viewed in this figure.

When the liquid refrigerant pump 14 stops at a power failure, the supply of the liquid refrigerant to the head side chamber 23 is stopped. However, the piston 12 is pushed by the coil spring 13, and gradually moves to the right, as viewed in this figure. Thus, the liquid refrigerant contained in the head side chamber 23 is supplied to the bearing 20. Consequently, the bearing 20 can be prevented from being damaged while the rotary shaft 22 reduces the rotational speed thereof until stops.

Figure 4:
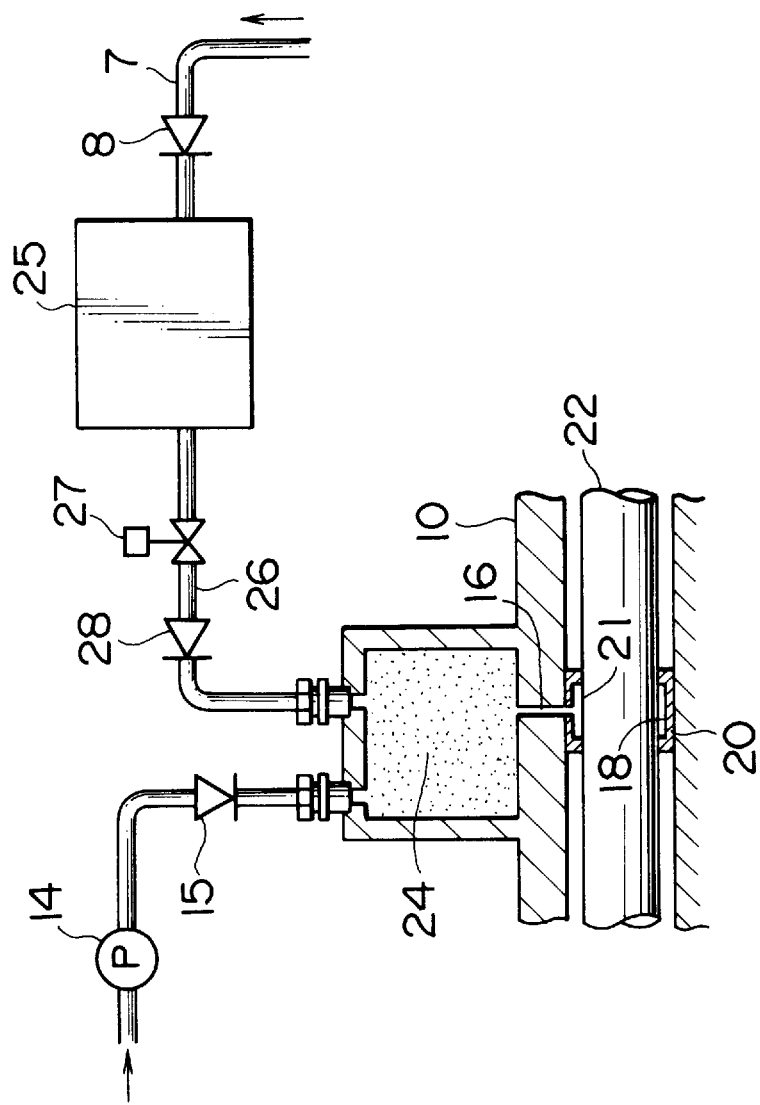
FIG. 4 is a partially sectional view showing a fourth embodiment of the present invention.

Referring to FIG. 4, there is illustrated a fourth embodiment of the present invention.

This fourth embodiment is provided with a reservoir tank 24 for storing a liquid refrigerant. Further, a solenoid valve 27 and a check valve 28 are inserted into a gas pipe 26 which connects this reservoir liquid tank 24 with a storage gas tank 25 for storing a high-pressure gaseous refrigerant.

Thus during an operation of a refrigerator, the solenoid valve 27 is closed. Further, a high-pressure gaseous refrigerant discharged from a compressor flows into the storage gas tank 25 through the gas pipe 7 and the check valve 8, and is then stored in the storage gas tank 25.

Moreover, the liquid refrigerant is pressurized by a liquid refrigerant pump 14, and thus enters the reservoir liquid tank 24 through the check valve 15. Subsequently, the liquid refrigerant flows therefrom into a recess portion 18 dug in a bearing surface portion 21 of a bearing 20 through a passage 16 and thus lubricates a bearing surface 21 of the bearing 20 and the outer peripheral surface of the rotary shaft 22.

When a power failure occurs, the solenoid valve 27 opens. Further, the high-pressure gaseous refrigerant contained in the storage gas tank 25 flows into the reservoir liquid tank 24 through the gas pipe 26, the solenoid valve 27 and the check valve 28, and pressurizes the liquid refrigerant contained the tank 24. Thus, the liquid refrigerant stored in the reservoir liquid tank 24 is supplied to the bearing 20 while the rotary shaft 22 reduces the rotational speed thereof until stops.

Turning next to FIG. 5, there is illustrated a fifth embodiment of the present invention.

In the case of this fifth embodiment, a gas cylinder 9 is connected to a reservoir liquid tank 24 through a gas pipe 26 provided with a solenoid valve 27. The rest of the configuration of the fifth embodiment is similar to the corresponding portion of the fourth embodiment, which is illustrated in FIG. 4.

Thus, when a power failure occurs, the solenoid valve 27 opens, high-pressure inactive (or inert) gas, such as nitrogen gas, stored in a gas cylinder 9 enters the reservoir tank 24 through the gas pipe 26 and the solenoid valve 27. Then, this gas pressurizes the liquid refrigerant in the tank 24.

Incidentally, when the pressure of the liquid refrigerant being present downstream from the check valve 15 is lowered to a value which is lower than a predetermined pressure, the solenoid valve 27 may be adapted to open in response to a command signal sent from a pressure sensor 70 detecting such a pressure drop.

Figure 6:
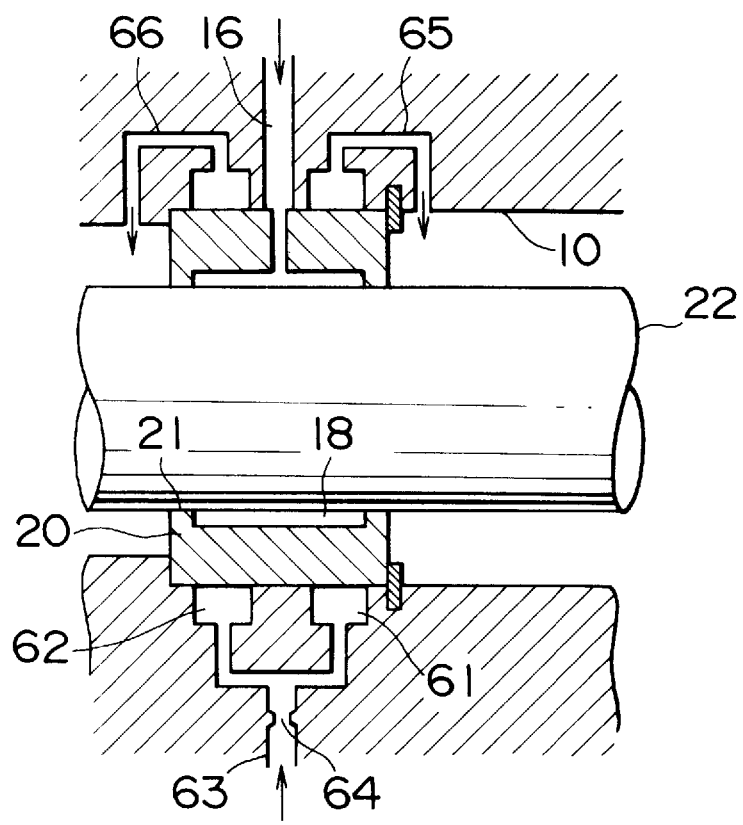
FIG. 6 is a partially sectional view showing a sixth embodiment of the present invention.

Referring next to FIG. 6, there is shown a sixth embodiment of the present invention.

In the case of this sixth embodiment, ring-shaped refrigerant jackets 61 and 62 are formed on the inner peripheral surface of a housing 10 of a compressor in such a way as to be placed on the outer peripheral surface side of the bearing 20.

Further, this embodiment is adapted so that the liquid refrigerant is supplied to these jackets 61 and 62 through a passage 63 and a throttle 64.

Thus, during the operation of the compressor, the liquid refrigerant enters the recess portion 18 through the passage 16 and lubricates the bearing surface 21 of the bearing 29 and the outer peripheral surface of the rotary shaft 22.

Simultaneously with this, the liquid refrigerant is throttled by the throttle 64 through the passage 63. Thereafter, the liquid refrigerant enters the refrigerant jackets 61 and 62 and further evaporates in these jackets. Thus, the liquid refrigerant cools the bearing 20 by latent heat of vaporization thereof.

The evaporated gaseous refrigerant is discharged through passages 65 and 66.

Thus, the temperature rising of the bearing 2 can be prevented. Consequently, the liquid refrigerant supplied onto the bearing surface 21 of the bearing 20 can be prevented evaporating thereof.

Figure 7:
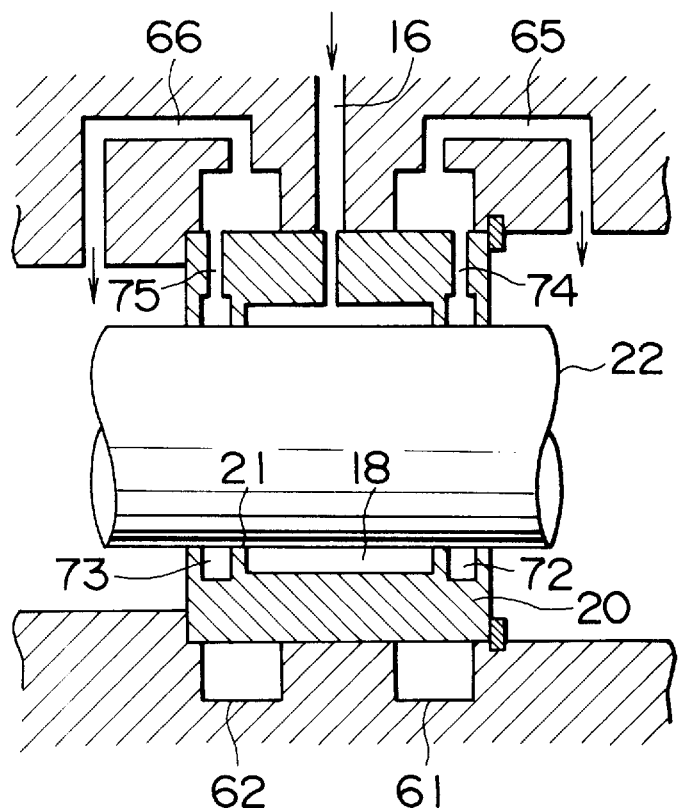
FIG. 7 is a partially sectional view showing a seventh embodiment of the present invention.
Figure 8:
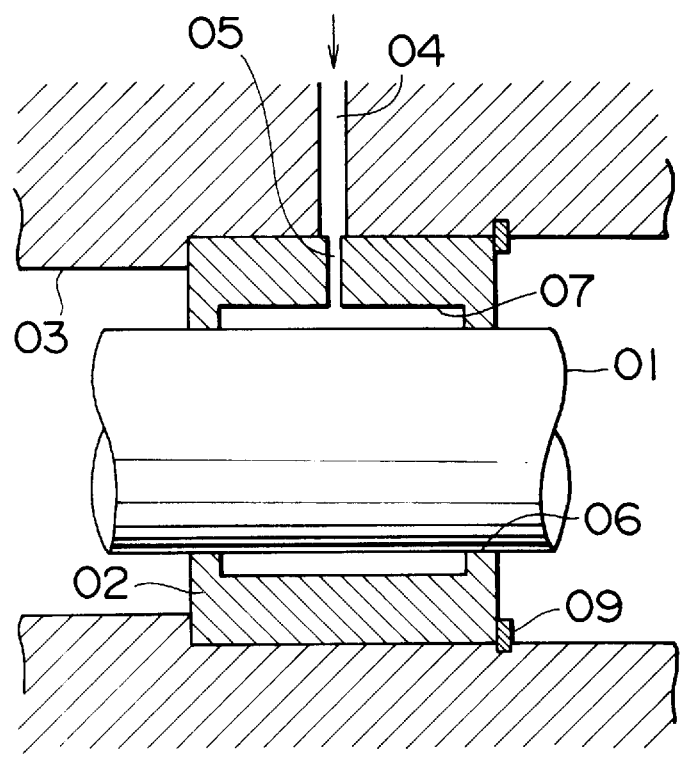
FIG. 8 is a sectional diagram showing a bearing of a compressor relating to the present invention, which is intended for use in a refrigerator.

Turning to FIG. 7, there is illustrated a seventh embodiment of the present invention.

In the case of this seventh embodiment, ring-like grooves 72 and 73 are bored in the bearing surface portion 21 of the bearing 20 outside both sides of the recess portion 18, which are arranged in the direction of the rotary shaft. These grooves 72 and 73 communicate with refrigerant jackets 61 and 62 through passages 74 and 75, respectively.

Thus, during an operation of a refrigerator, a liquid refrigerant enters the recess portion 18 through a passage 16, and lubricates the bearing surface 21 of the bearing 20 and the outer peripheral surface of the rotary shaft 22.

Upon completion of the lubrication, the liquid refrigerant enters the grooves 72 and 73 and then flows into through the passages 74 and 75 into the refrigerant jackets 61 and 62, respectively, wherein the refrigerant evaporates. Thereafter, the refrigerant flows out of the jackets 61 and 62 through passages 65 and 66, respectively.

Although preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

We claim:

1. A compressor for use in a refrigerator, which has a rotary shaft supported by a bearing lubricated by a liquid refrigerant, comprising:

a header for storing a predetermined amount of a high-pressure liquid refrigerant to be supplied to said bearing; and valving operable for maintaining an internal pressure of said header at a high pressure for a predetermined time period after a power failure.

2. The compressor for use in a refrigerator as set forth in claim 1, which further comprises:

an evaporator having a reservoir; and a liquid refrigerant pump, wherein a saturated liquid refrigerant stored in said reservoir of said evaporator is supplied to said header by being pressurized by said liquid refrigerant pump.

3. The compressor for use in a refrigerator as set forth in claim 1, which further comprises a condenser having a reservoir; and valving operable upon a power failure to supply a liquid refrigerant, which is stored in said reservoir of said condenser, to said header.

4. The compressor for use in a refrigerator as set forth in claim 2, which further comprises:

a tank for storing a liquid refrigerant therein;

a heater for heating the liquid refrigerant stored in said tank;

a controller for regulating a heating value of said heater; and valving operable upon a power failure to supply liquid refrigerant from said tank to said header.

* * * * *